United States Patent
Iwasaki et al.

(10) Patent No.: US 11,348,606 B2
(45) Date of Patent: May 31, 2022

(54) MAGNETIC HEAD FOR HIGH DENSITY MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hitoshi Iwasaki, Nerima (JP); Naoyuki Narita, Funabashi (JP); Hirofumi Suto, Ota (JP); Masayuki Takagishi, Kunitachi (JP); Tazumi Nagasawa, Yokohama (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/171,037

(22) Filed: Feb. 9, 2021

(65) Prior Publication Data
US 2022/0068299 A1   Mar. 3, 2022

(30) Foreign Application Priority Data
Aug. 25, 2020 (JP) .............................. JP2020-141831

(51) Int. Cl.
*G11B 5/39* (2006.01)
*G11B 5/09* (2006.01)
(Continued)

(52) U.S. Cl.
CPC .............. *G11B 5/3906* (2013.01); *G11B 5/09* (2013.01); *G11B 5/314* (2013.01); *G11B 5/3146* (2013.01); *G11B 2005/0024* (2013.01)

(58) Field of Classification Search
None
See application file for complete search history.

(56) References Cited

U.S. PATENT DOCUMENTS

| 8,922,949 B1 * | 12/2014 | Koui | G11B 5/3133 |
| | | | 360/125.3 |
| 10,978,098 B1 * | 4/2021 | Narita | G11B 5/3143 |

(Continued)

FOREIGN PATENT DOCUMENTS

JP   2014-130672 A   7/2014

*Primary Examiner* — Tan X Dinh
(74) *Attorney, Agent, or Firm* — Oblon, McClelland, Maier & Neustadt, L.L.P.

(57) ABSTRACT

According to one embodiment, a magnetic head includes first and second magnetic poles, and a stacked body provided between the first and second magnetic poles. The stacked body includes a first magnetic layer, a second magnetic layer provided between the first magnetic pole and the first magnetic layer, a third magnetic layer provided between the first magnetic pole and the second magnetic layer, a first nonmagnetic layer provided between the second and first magnetic layers, a second nonmagnetic layer provided between the third and second magnetic layers, and a third nonmagnetic layer provided between the first magnetic pole and the third magnetic layer. The second magnetic layer includes first and second magnetic regions. The second magnetic region is between the second nonmagnetic layer and the first magnetic region. The first magnetic region includes a first element. The second magnetic region includes the first element, and a second element.

19 Claims, 10 Drawing Sheets

(51) Int. Cl.
   *G11B 5/31*     (2006.01)
   *G11B 5/00*     (2006.01)

(56) References Cited

U.S. PATENT DOCUMENTS

| | | | |
|---|---|---|---|
| 11,062,728 B2* | 7/2021 | Takagishi | G11B 5/315 |
| 2012/0262821 A1* | 10/2012 | Taguchi | G11B 5/235 |
| | | | 360/99.08 |
| 2013/0050869 A1* | 2/2013 | Nagasaka | G11B 5/3146 |
| | | | 360/75 |
| 2014/0104724 A1* | 4/2014 | Shiroishi | G11B 5/737 |
| | | | 360/75 |
| 2014/0146420 A1 | 5/2014 | Shimizu et al. | |
| 2017/0077394 A1* | 3/2017 | Saida | H01L 43/08 |
| 2021/0104257 A1* | 4/2021 | Iwasaki | G11B 5/11 |
| 2021/0142821 A1* | 5/2021 | Iwasaki | G11B 5/315 |
| 2021/0217440 A1* | 7/2021 | Suto | G11B 5/3109 |

\* cited by examiner

MAGNETIC HEAD FOR HIGH DENSITY MAGNETIC RECORDING DEVICE

CROSS-REFERENCE TO RELATED APPLICATIONS

This application is based upon and claims the benefit of priority from Japanese Patent Application No. 2020-141831, filed on Aug. 25, 2020; the entire contents of which are incorporated herein by reference.

FIELD

Embodiments described herein generally relate to a magnetic head and a magnetic recording device.

BACKGROUND

Information is recorded in a magnetic recording medium such as a HDD (Hard Disk Drive) or the like by using a magnetic head. It is desirable to increase the recording density of the magnetic recording device.

DETAILED DESCRIPTION

Figure 1:
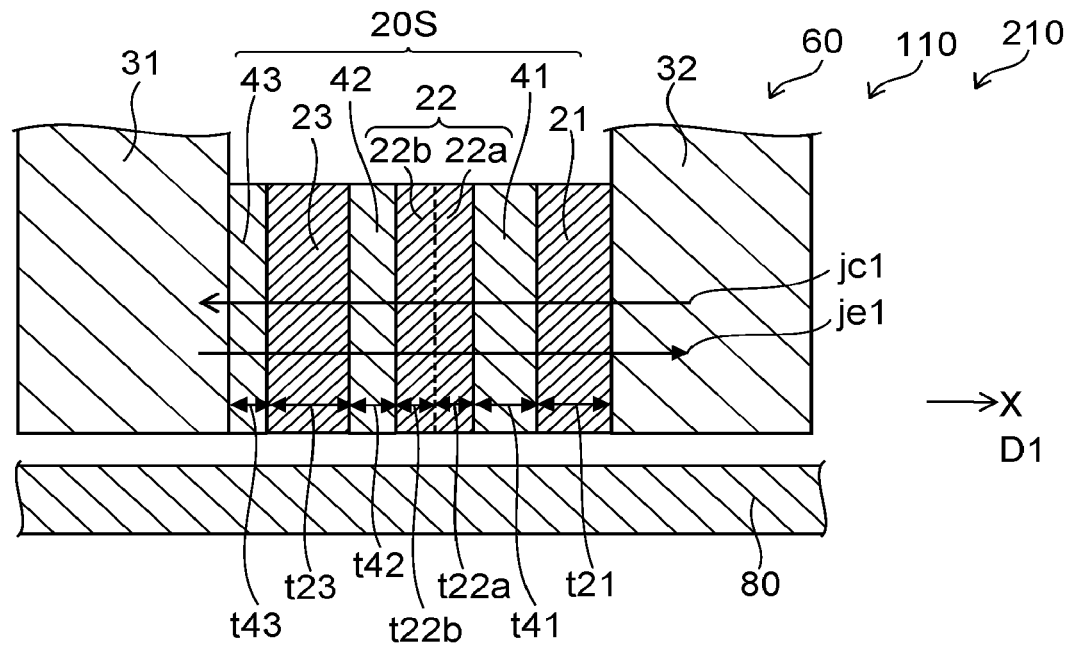
FIG. 1 is a schematic cross-sectional view illustrating a magnetic head according to a first embodiment.

According to one embodiment, a magnetic head includes a first magnetic pole, a second magnetic pole, and a stacked body provided between the first magnetic pole and the second magnetic pole. The stacked body includes a first magnetic layer, a second magnetic layer provided between the first magnetic pole and the first magnetic layer, a third magnetic layer provided between the first magnetic pole and the second magnetic layer, a first nonmagnetic layer provided between the second magnetic layer and the first magnetic layer, the first nonmagnetic layer including Cu, a second nonmagnetic layer provided between the third magnetic layer and the second magnetic layer, and a third nonmagnetic layer provided between the first magnetic pole and the third magnetic layer. The second magnetic layer includes a first magnetic region and a second magnetic region. The second magnetic region is between the second nonmagnetic layer and the first magnetic region. The first magnetic region includes a first element including at least one of Fe, Co, or Ni. The second magnetic region includes the first element, and a second element including at least one selected from the group consisting of Cr, V, Mn, Ti, and Sc. The first magnetic region does not include the second element. Or a concentration of the second element in the first magnetic region is less than a concentration of the second element in the second magnetic region.

According to one embodiment, a magnetic recording device includes the magnetic head described above; and an electrical circuit configured to supply a current to the stacked body. The current has an orientation from the first magnetic layer toward the third magnetic layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

Figure 2:
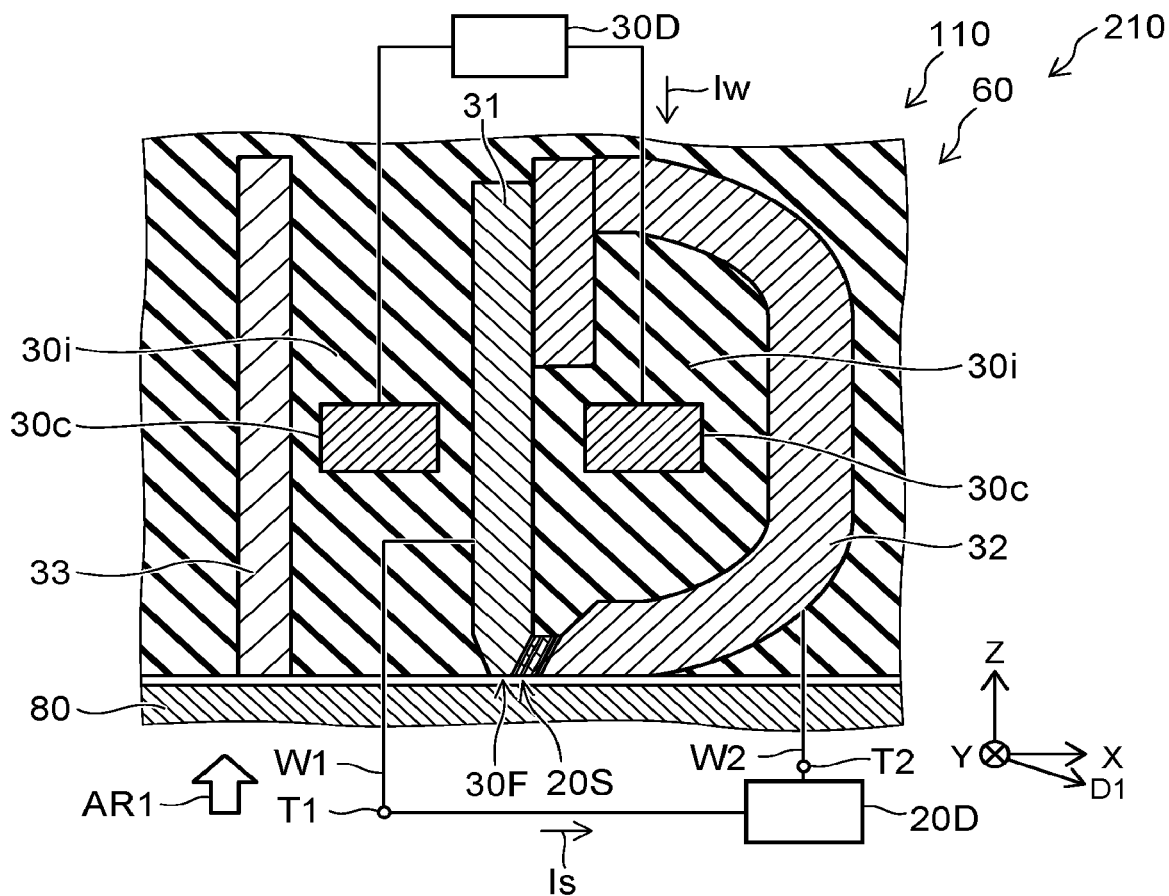
FIG. 2 is a schematic cross-sectional view illustrating a magnetic recording device according to the first embodiment.

FIG. 2 is a schematic cross-sectional view illustrating a magnetic recording device according to the first embodiment.

As shown in FIG. 2, the magnetic recording device 210 according to the embodiment includes the magnetic head 110 and an electrical circuit 20D. The magnetic recording device 210 may include a magnetic recording medium 80. For example, at least a recording operation is performed in the magnetic recording device 210. In the recording operation, information is recorded in the magnetic recording medium 80 by using the magnetic head 110.

The magnetic head 110 includes a recording part 60. As described below, the magnetic head 110 may include a reproducing part. The recording part 60 includes a first magnetic pole 31, a second magnetic pole 32, and a stacked body 20S. The stacked body 20S is located between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield. The first magnetic pole 31 may be the trailing shield; and the second magnetic pole 32 may be the major magnetic pole. Hereinbelow, the first magnetic pole 31 is taken to be the major magnetic pole; and the second magnetic pole 32 is taken to be the trailing shield.

The direction from the magnetic recording medium 80 toward the magnetic head 110 is taken as a Z-axis direction. One direction perpendicular to the Z-axis direction is taken as an X-axis direction. A direction perpendicular to the Z-axis direction and the X-axis direction is taken as a Y-axis direction. For example, the Z-axis direction corresponds to the height direction. For example, the X-axis direction corresponds to the down-track direction. For example, the Y-axis direction corresponds to the cross-track direction. The magnetic recording medium 80 and the magnetic head 110 move relatively along the down-track direction. A magnetic field (a recording magnetic field) that is generated from the magnetic head 110 is applied to the desired position of the magnetic recording medium 80. The magnetization of the desired position of the magnetic recording medium 80 is controlled to be in a direction corresponding to the recording magnetic field. Thereby, the information is recorded in the magnetic recording medium 80.

The direction from the first magnetic pole 31 toward the second magnetic pole 32 is taken as a first direction D1. The first direction D1 substantially corresponds to the X-axis direction. The first direction D1 may be tilted at a small angle with respect to the X-axis direction.

A coil 30c is provided as shown in FIG. 2. In the example, a portion of the coil 30c is between the first magnetic pole 31 and the second magnetic pole 32. A shield 33 is provided in the example. The first magnetic pole 31 is between the shield 33 and the second magnetic pole 32 in the X-axis direction. Another portion of the coil 30c is between the shield 33 and the first magnetic pole 31. An insulating portion 30i is provided between these multiple components.

As shown in FIG. 2, a recording current Iw is supplied from a recording circuit 30D to the coil 30c. A recording magnetic field that corresponds to the recording current Iw is applied from the first magnetic pole 31 to the magnetic recording medium 80.

As shown in FIG. 2, the first magnetic pole 31 includes a medium-facing surface 30F. The medium-facing surface 30F, for example, an ABS (Air Bearing Surface). For example, the medium-facing surface 30F faces the magnetic recording medium 80. For example, the medium-facing surface 30F is along the X-Y plane.

As shown in FIG. 2, the electrical circuit 20D is electrically connected to the stacked body 20S. In the example, the stacked body 20S is electrically connected to the first and second magnetic poles 31 and 32. A first terminal T1 and a second terminal T2 are provided in the magnetic head 110. The first terminal T1 is electrically connected to the stacked body 20S via first wiring W1 and the first magnetic pole 31. The second terminal T2 is electrically connected to the stacked body 20S via second wiring W2 and the second magnetic pole 32. For example, a current Is (e.g., a direct current) is supplied from the electrical circuit 20D to the stacked body 20S.

As shown in FIG. 1, the stacked body 20S includes a first magnetic layer 21, a second magnetic layer 22, a third magnetic layer 23, a first nonmagnetic layer 41, a second nonmagnetic layer 42, and a third nonmagnetic layer 43.

The first magnetic layer 21 is between the first magnetic pole 31 and the second magnetic pole 32. The second magnetic layer 22 is located between the first magnetic pole 31 and the first magnetic layer 21. The third magnetic layer 23 is located between the first magnetic pole 31 and the second magnetic layer 22.

The first nonmagnetic layer 41 is located between the second magnetic layer 22 and the first magnetic layer 21.

The first nonmagnetic layer 41 includes Cu. The first nonmagnetic layer 41 is, for example, a Cu layer.

The second nonmagnetic layer 42 is located between the third magnetic layer 23 and the second magnetic layer 22. The third nonmagnetic layer 43 is located between the first magnetic pole 31 and the third magnetic layer 23.

In the example, the first magnetic layer 21 contacts the second magnetic pole 32. The first nonmagnetic layer 41 contacts the second magnetic layer 22 and the first magnetic layer 21. The second nonmagnetic layer 42 contacts the third magnetic layer 23 and the second magnetic layer 22. The third nonmagnetic layer 43 contacts the first magnetic pole 31 and the third magnetic layer 23.

The second magnetic layer 22 includes a first magnetic region 22a and a second magnetic region 22b. The second magnetic region 22b is between the second nonmagnetic layer 42 and the first magnetic region 22a. The first magnetic region 22a is a region at the first nonmagnetic layer 41 side. The second magnetic region 22b is a region at the second nonmagnetic layer 42 side. For example, the first magnetic region 22a contacts the first nonmagnetic layer 41. For example, the second magnetic region 22b contacts the second nonmagnetic layer 42.

The first magnetic region 22a includes a first element that includes at least one of Fe, Co, or Ni. The second magnetic region 22b includes the first element and a second element. The second element includes at least one selected from the group consisting of Cr, V, Mn, Ti, and Sc. When the second magnetic region 22b includes such a material, for example, the second magnetic region 22b has negative spin polarization. The first magnetic region 22a does not include the second element. Or, the concentration of the second element in the first magnetic region 22a is less than the concentration of the second element in the second magnetic region 22b. When the first magnetic region 22a includes such a material, the first magnetic region 22a has positive spin polarization.

In one example, the concentration of the second element in the first magnetic region 22a is substantially 0 atomic %. For example, the concentration of the second element in the first magnetic region 22a may be not less than 0 atomic % but less than 20 atomic %. For example, the concentration of the second element in the second magnetic region 22b is not less than 20 atomic % and not more than 50%.

As described above, the current Is is supplied from the electrical circuit 20D to the stacked body 20S (referring to FIG. 2). As shown in FIG. 1, a current jc1 (the current Is) that flows through the stacked body 20S has an orientation from the first magnetic layer 21 toward the third magnetic layer 23. An electron current je1 has an orientation from the third magnetic layer 23 toward the first magnetic layer 21.

For example, when the current jc1 is not supplied to the stacked body 20S, the orientations of the magnetizations of the first, second, and third magnetic layers 21, 22, and 23 are substantially the same as the orientation of the magnetization of the first magnetic pole 31 and the orientation of the magnetization of the second magnetic pole 32. A portion of the magnetic field (the recording magnetic field) emitted from the first magnetic pole 31 is oriented toward the magnetic recording medium 80. On the other hand, another portion of the magnetic field (the recording magnetic field) emitted from the first magnetic pole 31 passes through the stacked body 20S and enters the second magnetic pole 32 without being oriented toward the magnetic recording medium 80. Therefore, the proportion of the portion of the recording magnetic field emitted from the first magnetic pole 31 that is oriented toward the magnetic recording medium 80 is low.

When the current jc1 is supplied to the stacked body 20S, for example, the orientation of the magnetization of at least a portion of the stacked body 20S (e.g., at least a portion of the second and third magnetic layers 22 and 23) is reversed with respect to the orientation of the magnetization of the first magnetic pole 31 and the orientation of the magnetization of the second magnetic pole 32. Thereby, the magnetic field (the recording magnetic field) that is emitted from the first magnetic pole 31 is not easily oriented toward the stacked body 20S. Therefore, the proportion of the portion of the recording magnetic field emitted from the first magnetic pole 31 that is oriented toward the magnetic recording medium 80 is high compared to when the current jc1 is not supplied to the stacked body 20S. The recording magnetic field that is emitted from the first magnetic pole 31 is effectively applied to the magnetic recording medium 80.

This phenomenon becomes more pronounced as the distance (the recording gap) between the first magnetic pole 31 and the second magnetic pole 32 is reduced. By using such a stacked body 20S, good recording can be performed even when the recording gap is small. According to the embodiment, the recording gap at which good recording is possible can be reduced. According to the embodiment, a magnetic recording device can be provided in which the recording density can be increased.

On the other hand, in MAMR (Microwave Assisted Magnetic Recording), the recording is performed by locally controlling the magnetic properties of the magnetic recording medium 80 by applying, to the magnetic recording medium 80, a high frequency magnetic field generated from a stacked body including multiple magnetic layers. In MAMR, the high frequency magnetic field is generated by the oscillations of the magnetizations of the magnetic layers.

Conversely, according to the embodiment, for example, the magnetization of at least a portion of the stacked body 20S reverses with respect to the magnetization of the first magnetic pole 31 and the magnetization of the second magnetic pole 32. The magnetic field that is emitted from the first magnetic pole 31 is efficiently applied to the magnetic recording medium 80 by an operation that is different from MAMR.

According to the embodiment, the second magnetic layer includes the first magnetic region 22a and the second magnetic region 22b. By such a configuration, the recording magnetic field that is emitted from the first magnetic pole 31 is effectively and more stably applied to the magnetic recording medium 80.

An example of experiment results when the second magnetic layer 22 does not include the first magnetic region 22a and the second magnetic region 22b will now be described.

Figure 3:
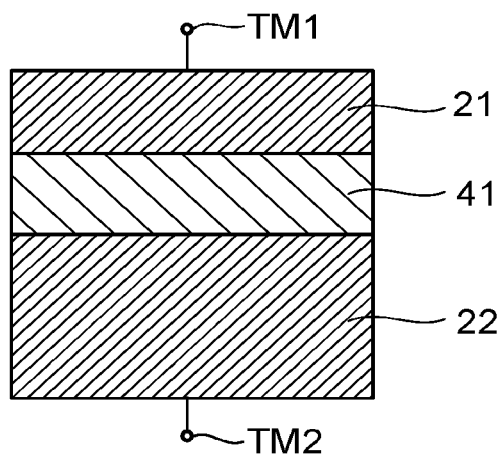
FIG. 3 is a schematic cross-sectional view illustrating experiment samples.

FIG. 3 is a schematic cross-sectional view illustrating experiment samples.

Figure 4:
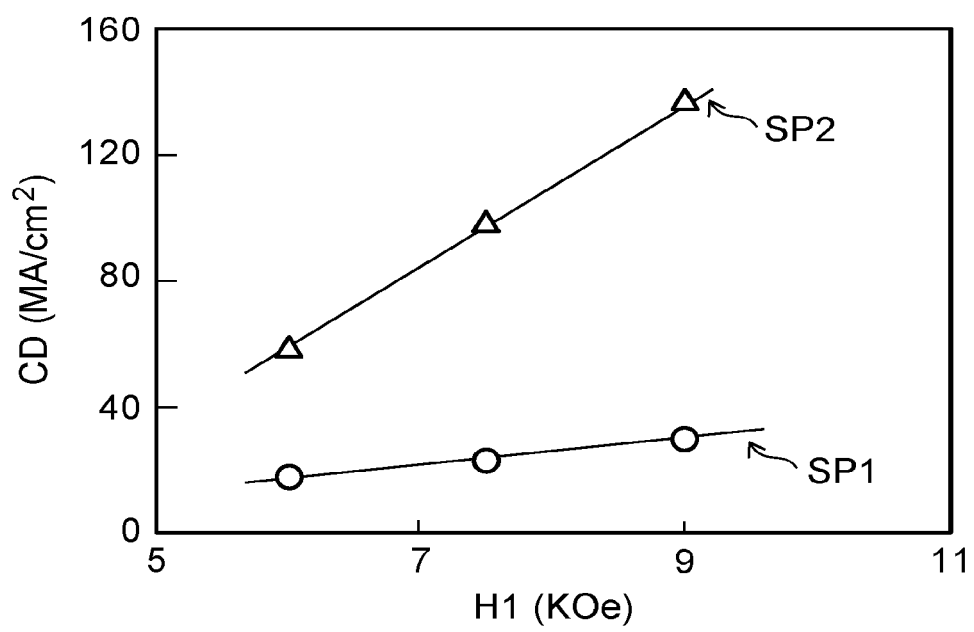
FIG. 4 is a graph illustrating the experiment results.

FIG. 4 is a graph illustrating the experiment results.

As shown in FIG. 3, the experiment samples included the first magnetic layer 21, the second magnetic layer 22, and the first nonmagnetic layer 41. The first nonmagnetic layer 41 was between the first magnetic layer 21 and the second magnetic layer 22. The first magnetic layer 21 was an FeCo layer. The first nonmagnetic layer 41 was a Cu layer. In a first sample, the second magnetic layer 22 included FeCr. In a second sample, the second magnetic layer 22 included FeCo. In the first sample, the second magnetic layer 22 had negative spin polarization. In the second sample, the second magnetic layer 22 had positive spin polarization.

For such samples, a current that had an orientation from a first terminal TM1 toward a second terminal TM2 was supplied while applying a magnetic field. The magnetic field had an orientation from the second magnetic layer 22 toward the first magnetic layer 21. The relationship between the fluctuation of the magnetization of the first magnetic layer 21 and the intensity of the magnetic field was verified.

The horizontal axis of FIG. 4 is an intensity H1 of the magnetic field. The vertical axis of FIG. 4 is a current density CD at which the magnetic field of the first magnetic layer 21 starts to fluctuate. In the first sample SP1 as shown in FIG. 4, the current density CD at which the magnetic field of the first magnetic layer 21 starts to fluctuate was low. In the second sample SP2, the current density CD at which the magnetic field of the first magnetic layer 21 starts to fluctuate was high. It is considered that the magnetization of the first magnetic layer 21 was unstable in the first sample SP1.

It is considered that the magnetization of the first magnetic layer 21 is destabilized in the first sample SP1 by the transmission spin-transfer torque (STT) from the second magnetic layer 22 that has negative polarization acting on the first magnetic layer 21.

According to the embodiment, the first magnetic region 22a and the second magnetic region 22b are provided in the second magnetic layer 22. For example, the first magnetic region 22a has positive spin polarization. Therefore, the action of the STT on the first magnetic layer 21 is suppressed, and the magnetization of the first magnetic layer 21 is stable. It is considered that by stabilizing the magnetization of the first magnetic layer 21, for example, the magnetizations of the second and third magnetic layers 22 and 23 can be stably reversed by the STT from the first magnetic layer 21. Thereby, according to the embodiment, the recording magnetic field that is emitted from the first magnetic pole 31 is effectively and more stably applied to the magnetic recording medium 80. A magnetic head can be provided in which the recording density can be increased.

An example of the reversal of the magnetization will now be described.

Figure 5A:
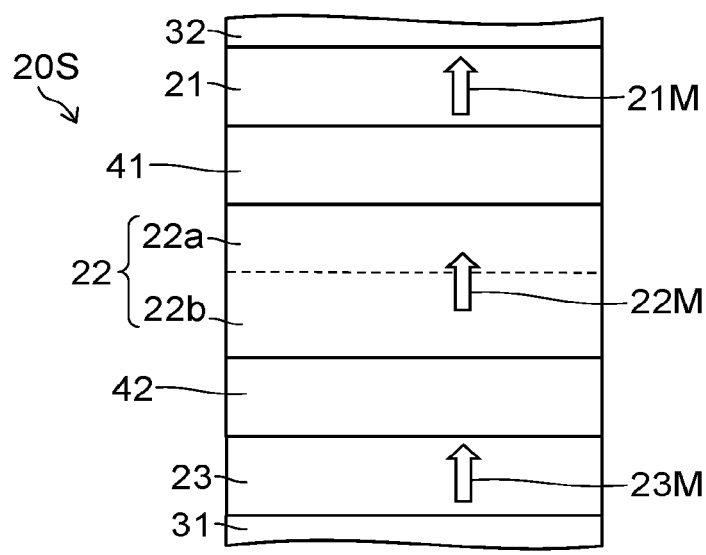
FIGS. 5A to 5C are schematic views illustrating the magnetic head according to the embodiment.
Figure 5B:
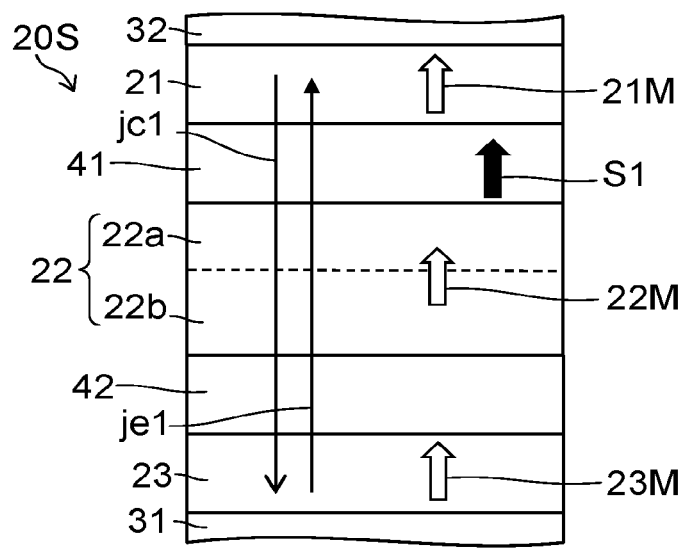
Figure 5C:
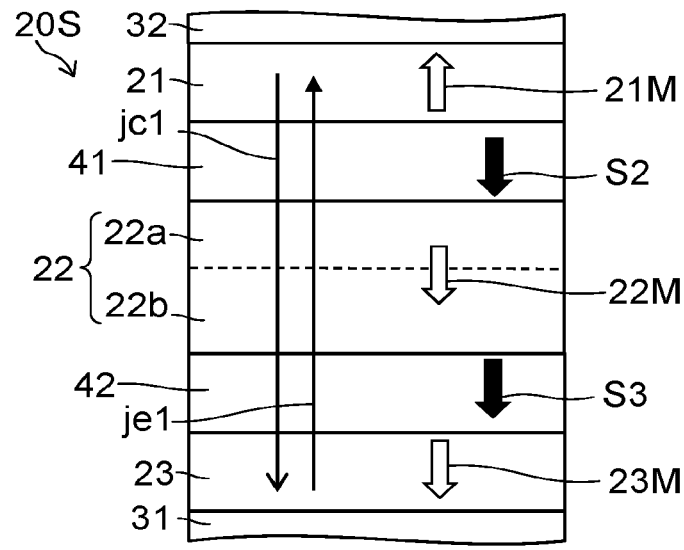

FIGS. 5A to 5C are schematic views illustrating the magnetic head according to the embodiment.

In these drawings, the magnetizations of the first and second magnetic poles 31 and 32 have orientations from the first magnetic pole 31 toward the second magnetic pole 32.

As shown in FIG. 5A, a magnetization 21M of the first magnetic layer 21, a magnetization 22M of the second magnetic layer 22, and the magnetization of the third magnetic layer 23 are the same as the orientations of the magnetizations of the first and second magnetic poles 31 and 32 (the orientation from the first magnetic pole 31 toward the second magnetic pole 32) when the current jc1 is not supplied to the stacked body 20S. The orientation of the electron current je1 is the orientation from the second magnetic pole 32 toward the first magnetic pole 31.

As shown in FIG. 5B, when the current jc1 that is not less than a threshold is supplied to the stacked body 20S, a positive transmission spin-transfer torque S1 from the first magnetic region 22a acts on the first magnetic layer 21; and the magnetization 21M of the first magnetic layer 21 is stabilized.

As shown in FIG. 5C, the magnetization 22M of the second magnetic layer 22 is reversed by a positive reflection spin-transfer torque S2 from the first magnetic layer 21. A magnetization 23M of the third magnetic layer 23 is reversed by a negative reflection spin-transfer torque S3 from the reversed magnetization 22M. Thus, for example, the magnetization 22M of the second magnetic layer 22 and the magnetization 23M of the third magnetic layer 23 are stably reversed with respect to the magnetizations of the first and second magnetic poles 31 and 32. Thereby, the recording magnetic field that is emitted from the first magnetic pole 31 is effectively applied to the magnetic recording medium 80. A magnetic head can be provided in which the recording density can be increased. The recording performance improves.

According to the embodiment, the first magnetic layer 21 includes, for example, Fe and Co. For example, the first magnetic layer 21 has positive spin polarization.

In the magnetic head 110, the third magnetic layer 23 includes, for example, the first element described above and the second element described above. For example, the third magnetic layer 23 has negative spin polarization. As described below, the third magnetic layer 23 may have positive spin polarization.

As described above, the first nonmagnetic layer 41 includes Cu. The spin-transfer torque can be efficiently transferred thereby.

The second nonmagnetic layer 42 includes, for example, Cu. The second nonmagnetic layer 42 may include Cu and the second element described above.

In the example of FIG. 1, the third nonmagnetic layer 43 includes, for example, at least one selected from the group consisting of Ta, Ru, and Cr.

In the magnetic head 110 as shown in FIG. 1, the first magnetic layer 21 has a thickness t21. The first magnetic region 22a has a thickness t22a. The second magnetic region 22b has a thickness t22b. The third magnetic layer 23 has a thickness t23. In the magnetic head 110, the first to third nonmagnetic layers 41 to 43 have thicknesses t41 to t43 (referring to FIG. 1).

In the magnetic head 110, it is favorable for the thickness t22a of the first magnetic region 22a to be, for example, not less than 0.5 nm and not more than 10 nm. By setting the thickness t22a to be not less than 0.5 nm, for example, the STT can be effectively reduced. By setting the thickness t22a to be not more than 10 nm, for example, an excessively large reversal current is suppressed; for example, high reliability is obtained. The thickness t22a may be not more than 0.3 nm. The recording capacity due to the reversal of the magnetization is effectively improved thereby.

For example, it is favorable for the thickness t22b of the second magnetic region 22b to be not less than 2 nm and not more than 7 nm. By setting the thickness t22b to be not less than 2 nm, for example, a large spin-transfer torque can be obtained, and the magnetization 23M of the third magnetic layer 23 can be effectively reversed by the action of the second magnetic region 22b. By setting the thickness t22b to be not more than 7 nm, for example, an excessively high hardness of the second magnetic region 22b can be suppressed. Therefore, the patterning of the stacked body 20S is easier.

It is favorable for the thickness of the second magnetic layer 22 (e.g., the sum of the thickness t22a and the thickness t22b) to be, for example, not less than 3 nm and not more than 10 nm.

It is favorable for the thickness t21 of the first magnetic layer 21 to be, for example, not less than 1 nm and not more than 3 nm. By setting the thickness t21 to be not less than 1 nm, for example, the magnetization 21M of the first magnetic layer 21 is stabilized. By setting the thickness t21 to be not more than 3 nm, for example, an excessively large gap length (the distance between the first magnetic pole 31 and the second magnetic pole 32) can be suppressed. For example, a high recording density is easily obtained.

It is favorable for the thickness t23 of the third magnetic layer 23 to be, for example, not less than 1 nm and not more than 5 nm. By setting the thickness t23 to be not less than 1 nm, for example, an extreme reduction of the magnetization of the third magnetic layer 23 can be suppressed. By setting the thickness t23 to be not more than 5 nm, for example, the reversal of the magnetization 23M of the third magnetic layer 23 is easier.

It is favorable for the thickness t41 of the first nonmagnetic layer 41 to be, for example, not less than 1 nm and not more than 5 nm. By setting the thickness t41 to be not less than 1 nm, for example, the magnetic separation between the first magnetic layer 21 and the second magnetic layer 22 is stabilized. By setting the thickness t41 to be not more than 5 nm, for example, the patterning of the stacked body 20S is easier.

It is favorable for the thickness t42 of the second nonmagnetic layer 42 to be, for example, not less than 1 nm and not more than 5 nm. By setting the thickness t42 to be not less than 1 nm, for example, the magnetic separation between the second magnetic layer 22 and the third magnetic layer 23 is stabilized. By setting the thickness t42 to be not more than 5 nm, for example, the patterning of the stacked body 20S is easier.

In the example of FIG. 1, it is favorable for the thickness t43 of the third nonmagnetic layer 43 to be, for example, not less than 1 nm and not more than 5 nm. By setting the thickness t43 to be not less than 1 nm, for example, the magnetic separation is easier at both X-axis direction sides of the third nonmagnetic layer 43. By setting the thickness t43 to be not more than 5 nm, for example, the transfer of the STT is easier.

Figure 6:
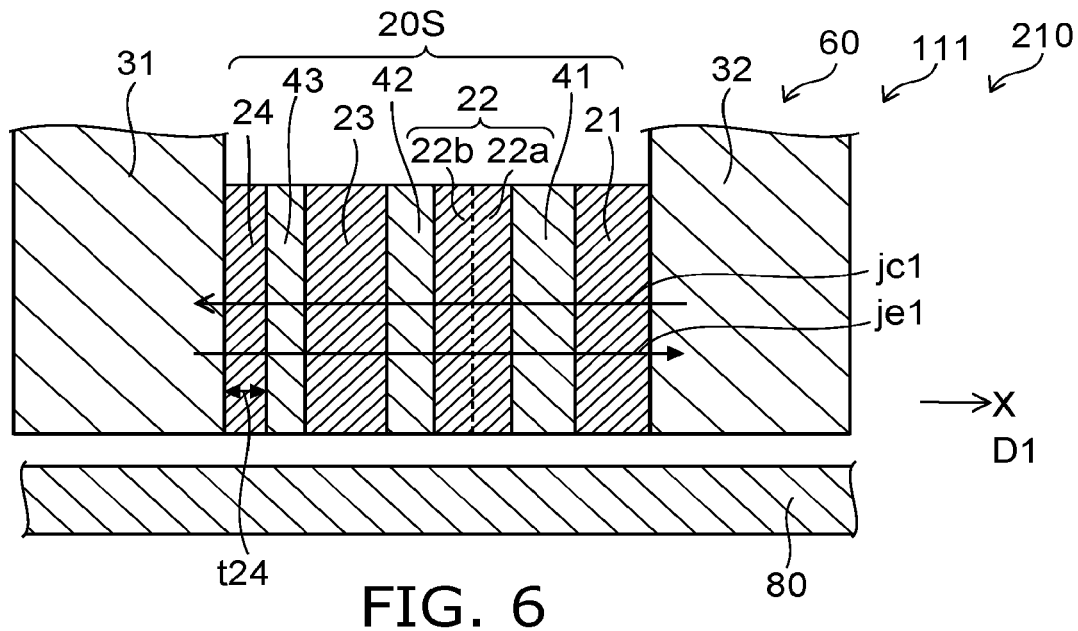
FIG. 6 is a schematic cross-sectional view illustrating a magnetic head according to the first embodiment.

FIG. 6 is a schematic cross-sectional view illustrating a magnetic head according to the first embodiment.

In the magnetic head 111 according to the embodiment as shown in FIG. 6, the stacked body 20S includes a fourth magnetic layer 24 in addition to the first to third magnetic layers 21 to 23 and the first to third nonmagnetic layers 41 to 43. In the magnetic head 111, the third magnetic layer 23 has positive spin polarization. Otherwise, the configuration of the magnetic head 111 may be similar to the configuration of the magnetic head 110.

The fourth magnetic layer 24 is between the first magnetic pole 31 and the third nonmagnetic layer 43. The fourth magnetic layer 24 includes, for example, the first and second elements. For example, the concentration of the second element in the fourth magnetic layer 24 is not less than 20 atomic % and not more than 50%. For example, the third magnetic layer 23 includes the first element described above. The third magnetic layer 23 is, for example, an FeCo layer. The third magnetic layer 23 does not include the second element described above. Or, the concentration of the second element in the third magnetic layer 23 is less than the concentration of the second element in the second magnetic region 22b. In one example, the fourth magnetic layer 24 contacts the first magnetic pole 31 and is magnetically coupled with the first magnetic pole 31. For example, a layer that magnetically couples the first magnetic pole 31 and the fourth magnetic layer 24 may be provided between the first magnetic pole 31 and the fourth magnetic layer 24.

In such a magnetic head 111 as well, the magnetization 21M of the first magnetic layer 21 is stabilized. For example, the magnetization of the second magnetic layer 22 and the magnetization 23M of the third magnetic layer 23 can be stably reversed. The recording magnetic field that is emitted from the first magnetic pole 31 is effectively applied to the magnetic recording medium 80. A magnetic head can be provided in which the recording density can be increased.

In the example of FIG. 6, the third nonmagnetic layer 43 includes, for example, Cu. The third nonmagnetic layer 43 may further include the second element. It is favorable for the thickness t43 of the third nonmagnetic layer 43 to be, for example, not less than 1 nm and not more than 5 nm.

In the example of FIG. 6, it is favorable for a thickness t24 of the fourth magnetic layer 24 to be, for example, not less than 2 nm and not more than 5 nm. By setting the thickness t24 to be not less than 2 nm, for example, negative polarization of the fourth magnetic layer 24 is stably obtained. By setting the thickness t24 to be not more than 5 nm, for example, an excessively large gap length can be suppressed. A steep reduction of the recording magnetic field can be suppressed. For example, a high recording density is easily obtained.

Figure 7:
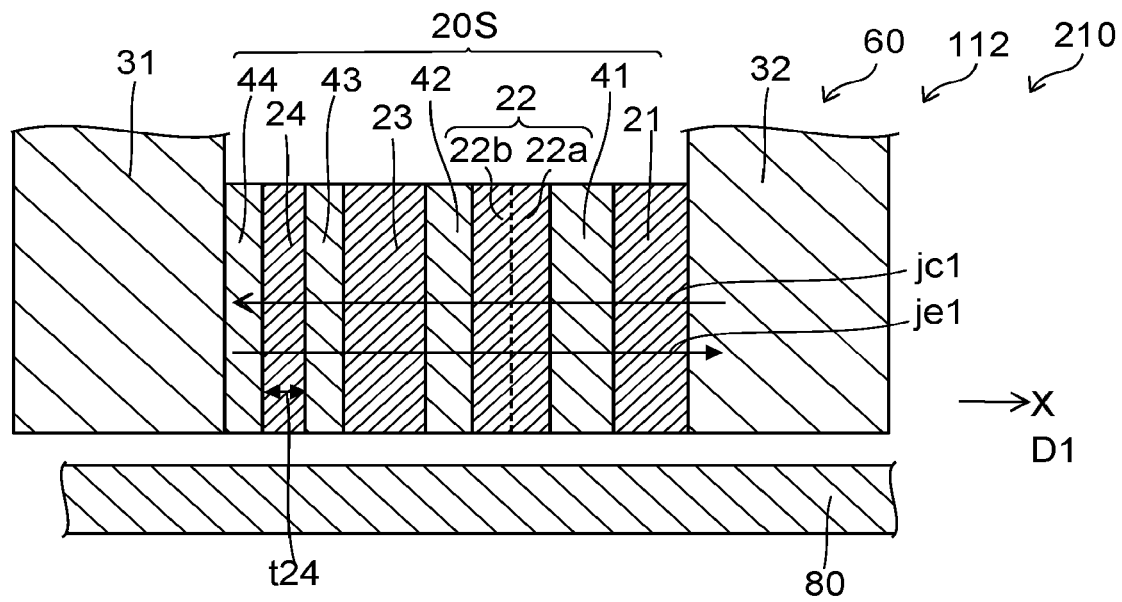
FIG. 7 is a schematic cross-sectional view illustrating a magnetic head according to the first embodiment.

FIG. 7 is a schematic cross-sectional view illustrating a magnetic head according to the first embodiment.

In the magnetic head 112 according to the embodiment as shown in FIG. 7 as well, the stacked body 20S includes the fourth magnetic layer 24 and a fourth nonmagnetic layer 44 in addition to the first to third magnetic layers 21 to 23 and the first to third nonmagnetic layers 41 to 43. In the magnetic head 112, the third magnetic layer 23 has negative spin polarization. Otherwise, the configuration of the magnetic head 112 may be similar to the configuration of the magnetic head 110.

The fourth magnetic layer 24 is between the first magnetic pole 31 and the third nonmagnetic layer 43. The fourth magnetic layer 24 includes, for example, the first and second elements. The concentration of the second element in the fourth magnetic layer 24 is not less than 20 atomic % and not more than 50%. For example, the third magnetic layer 23 includes the first and second elements. For example, the concentration of the second element in the third magnetic layer 23 is not less than 20 atomic % and not more than 50%.

The fourth nonmagnetic layer 44 is between the first magnetic pole 31 and the fourth magnetic layer 24. The fourth nonmagnetic layer 44 includes at least one selected from the group consisting of Ta, Ru, and Cr.

In such a magnetic head 112 as well, the magnetization 21M of the first magnetic layer 21 is stabilized. For example, the magnetization of the second magnetic layer 22 and the magnetization 23M of the third magnetic layer 23 can be stably reversed. The recording magnetic field that is emitted from the first magnetic pole 31 is effectively applied to the magnetic recording medium 80. A magnetic head can be provided in which the recording density can be increased.

In the example of FIG. 7, it is favorable for the thickness t24 of the fourth magnetic layer 24 to be, for example, not less than 1 nm and not more than 5 nm. By setting the thickness t24 to be not less than 1 nm, for example, the magnetic coupling between the magnetic pole 31 and the fourth magnetic layer 24 can be stably suppressed. For example, the transfer of the STT between the magnetic pole 31 and the fourth magnetic layer 24 can be stably suppressed. By setting the thickness t24 to be not more than 5 nm, for example, an excessively large gap length can be suppressed. A steep reduction of the recording magnetic field can be suppressed. For example, a high recording density is easily obtained.

Figure 8A:
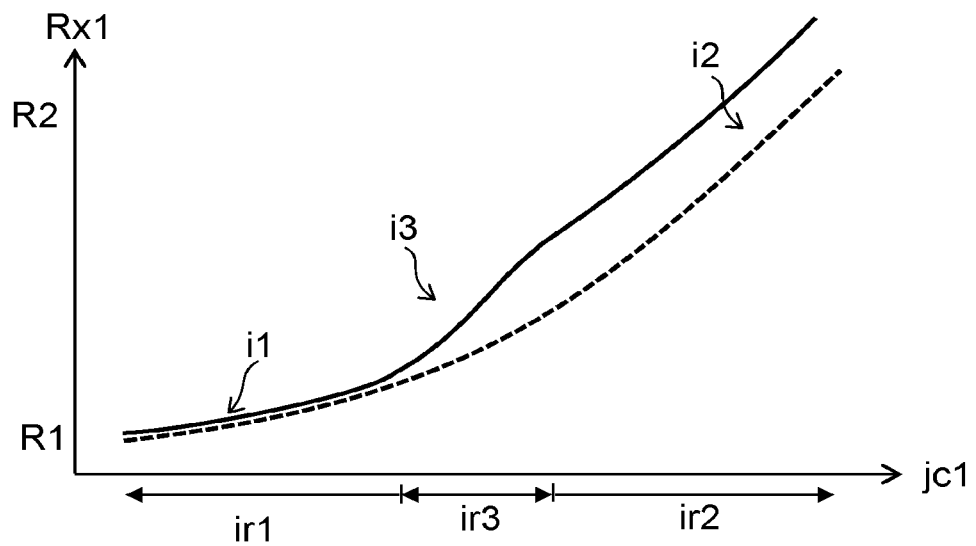
FIGS. 8A and 8B are schematic views illustrating characteristics of the magnetic head according to the first embodiment.
Figure 8B:
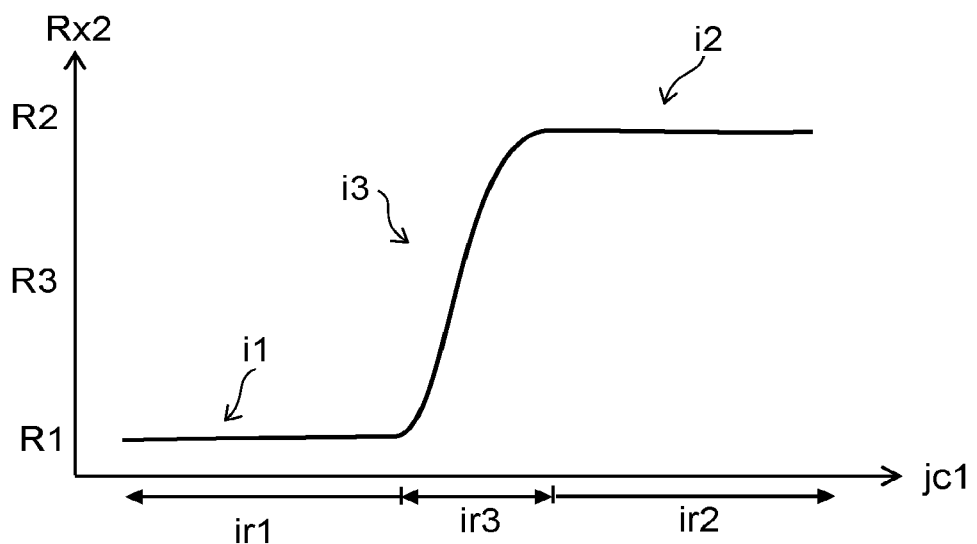

FIGS. 8A and 8B are schematic views illustrating characteristics of the magnetic head according to the first embodiment.

These figures schematically show the relationship between the electrical resistance of the stacked body 20S and the magnitude of the current jc1 flowing in the stacked body 20S according to the embodiment. In these figures, the horizontal axis is the magnitude of the current jc1. The vertical axis of FIG. 8A is an electrical resistance Rx1 of the stacked body 20S.

As shown in FIG. 8A, the electrical resistance Rx1 increases as the current jc1 increases. As shown in FIG. 8A, the magnitude of the current jc1 can be separated into a first current range ir1, a second current range ir2, and a third current range ir3. The third current range ir3 is between the first current range in and the second current range ir2.

In the first and second current ranges ir1 and ir2, the electrical resistance Rx1 changes as a quadratic function of the magnitude of the current jc1. It is considered that this is caused by the temperature of the stacked body 20S increasing as the current jc1 increases.

The change of the electrical resistance Rx1 in the third current range ir3 is different from the effect of the temperature increase. It is considered that the change of the electrical resistance Rx1 in the third current range ir3 is due to a magnetoresistance effect based on the reversal rates of the magnetizations of the magnetic layers.

FIG. 8B shows the relationship between an electrical resistance Rx2 and the magnitude of the current jc1, in which the change of the quadratic function (the effect of the temperature) of FIG. 8A has been removed. When the effect of the quadratic function is removed as shown in FIG. 8B, the electrical resistance Rx2 is substantially constant in the first current range ir1. Or, compared to the third current range ir3, the electrical resistance Rx2 gradually changes in the first current range ir1. The electrical resistance Rx2 changes in the third current range ir3. The electrical resistance Rx2 is substantially constant in the second current range ir2. Or, compared to the third current range ir3, the electrical resistance Rx2 gradually changes in the second current range ir2.

For example, as shown in FIG. 8B, the electrical resistance Rx2 of the stacked body 205 is a first resistance R1 when the current jc1 flowing in the stacked body 20S is a first current i1. The first current i1 is in the first current range ir1.

As shown in FIG. 8B, the electrical resistance Rx2 of the stacked body 20S is a second resistance R2 when the current jc1 flowing in the stacked body 20S is a second current i2. The second current i2 is greater than the first current i1. The second current i2 is in the second current range ir2. The second resistance R2 is greater than the first resistance R1.

The electrical resistance Rx2 of the stacked body 20S is a third resistance R3 at a third current i3 that is between the first current i1 and the second current i2. The third current i3 is in the third current range ir3.

For example, the electrical resistance Rx2 substantially does not oscillate when the current jc1 is the first or second current it or i2. For example, the electrical resistance Rx2 oscillates when the current jc1 is the third current i3. The first current i1, the second current i2, and the third current i3 have orientations from the first magnetic layer 21 toward the third magnetic layer 23.

Figure 9A:
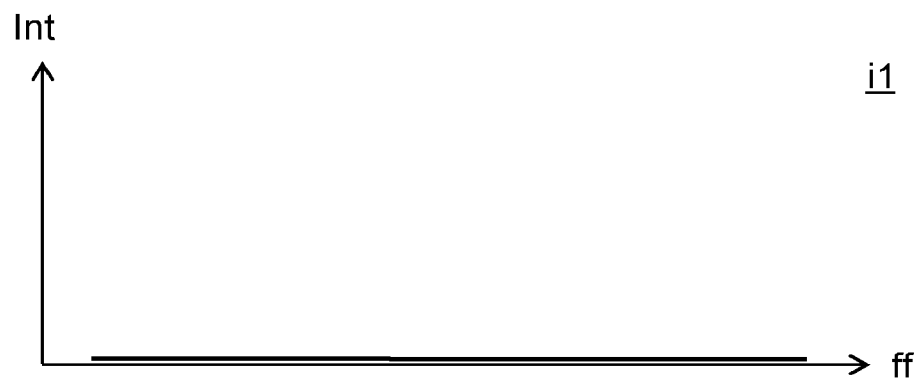
FIGS. 9A to 9C are schematic views illustrating characteristics of the magnetic head according to the embodiment.
Figure 9B:
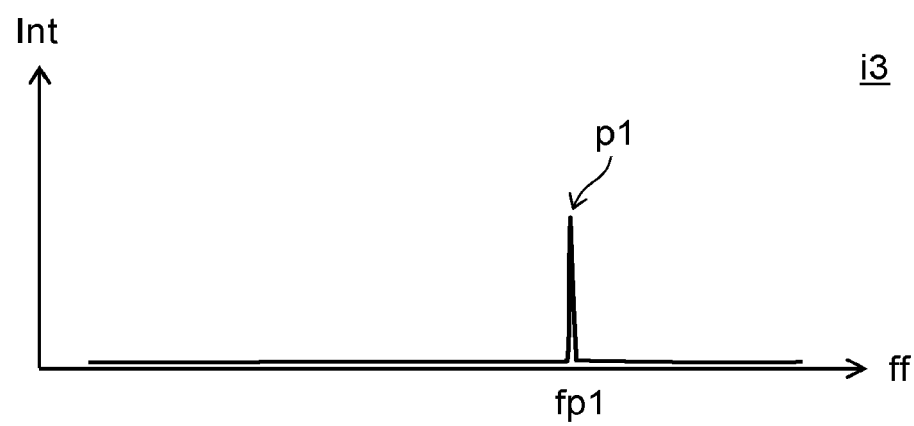
Figure 9C:

FIGS. 9A to 9C are schematic views illustrating characteristics of the magnetic head according to the embodiment.

These figures illustrate signals on which FFT (Fast Fourier Transform) processing of a portion of the signal of the electrical resistance Rx2 is performed. The signal of the electrical resistance Rx2 includes a component (a high frequency component) that temporally changes, and a component (the component of the temporal average value) that substantially does not change temporally. The temporally-changing component of the electrical resistance Rx2 is processed by the FFT processing. In these figures, the horizontal axis is the frequency ff. The vertical axis is an intensity Int of the signal. FIG. 9A corresponds to when the current jc1 is the first current i1. FIG. 9B corresponds to when the current jc1 is the third current i3. FIG. 9C corresponds to when the current jc1 is the second current i2.

As shown in FIG. 9B, when the current jc1 is the third current i3, a peak p1 is observed at one frequency fp1. The peak corresponds to a high frequency oscillation being generated by the stacked body 20S.

As shown in FIGS. 9A and 9C, the peak p1 is not distinctly observed when the current jc1 is the first or second current i1 or i2. For these currents, a magnetization oscillation that is effective for MAMR is substantially not generated.

Thus, the electrical resistance Rx2 of the stacked body 20S oscillates when the current jc1 flowing in the stacked body 20S is the third current i3 that is between the first current i1 and the second current i2.

According to the embodiment, the recording operation is performed using the stacked body 20S that has such characteristics.

The electrical circuit 20D is configured to supply the second current i2 described above to the stacked body 20S in the recording operation of using the magnetic head according to the embodiment to record the information in the magnetic recording medium 80. Compared to when the recording operation is performed without supplying the second current i2, the amount of the recording magnetic field oriented from the first magnetic pole 31 toward the magnetic recording medium 80 can be increased by performing the recording operation of supplying the recording current Iw from the recording circuit 30D to the coil while supplying a second current i2 such as that described above. The recording gap at which good recording is possible can be reduced. According to the embodiment, a magnetic recording device can be provided in which the recording density can be increased.

Second Embodiment

A second embodiment relates to a magnetic recording device. The magnetic recording device 210 (referring to FIG. 2, etc.) includes the magnetic head (e.g., the magnetic head 110) according to the embodiment, and the electrical circuit 20D that is configured to supply the current jc1 (or the current Is) to the stacked body 20S. The current jc1 has an orientation from the first magnetic layer 21 toward the third magnetic layer 23. The electrical circuit 20D is configured to supply the second current i2 described above to the stacked body 20S in the recording operation. The recording magnetic field that is emitted from the first magnetic pole 31 is effectively applied to the magnetic recording medium 80. A magnetic head can be provided in which the recording density can be increased.

An example of the magnetic recording medium 80 and the magnetic head included in the magnetic recording device 210 according to the embodiment will now be described.

Figure 10:
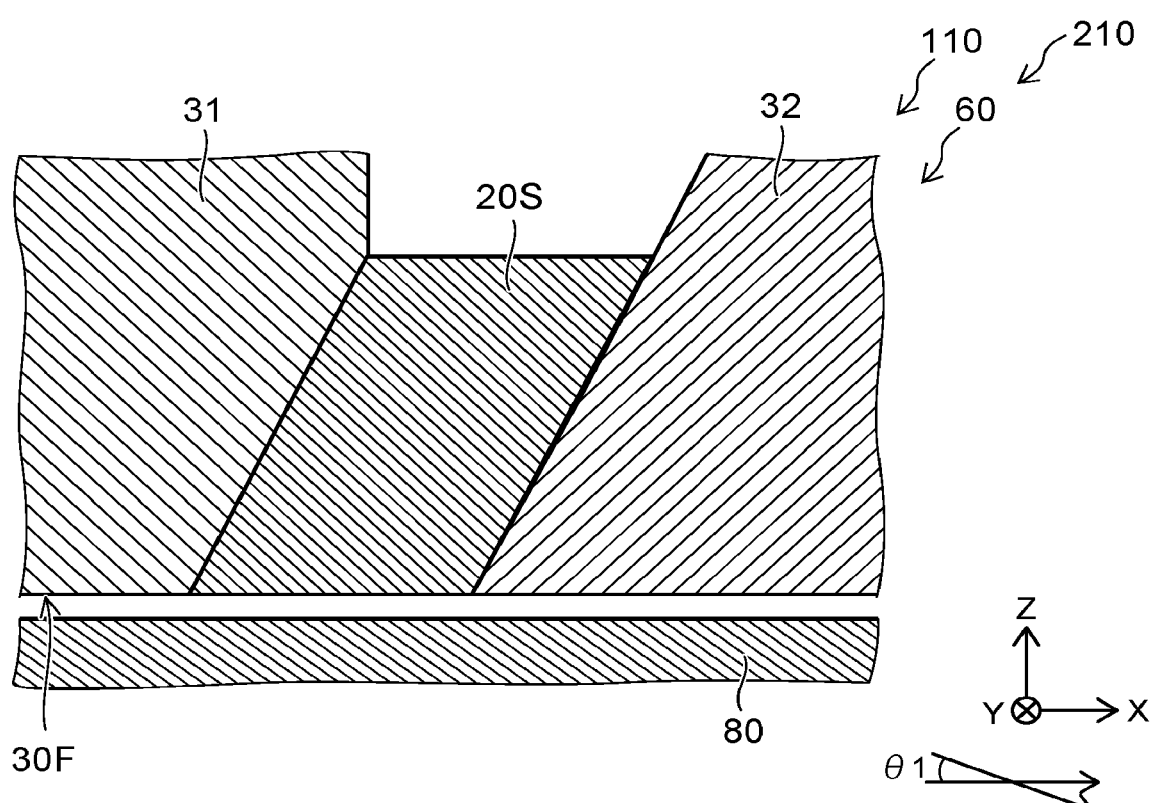
FIG. 10 is a schematic cross-sectional view illustrating the magnetic head according to the embodiment.

FIG. 10 is a schematic cross-sectional view illustrating the magnetic head according to the embodiment.

In the magnetic head (e.g., the magnetic head 110) according to the embodiment as shown in FIG. 10, the first direction D1 from the second magnetic pole 32 toward the first magnetic pole 31 may be oblique to the X-axis direction. The first direction D1 corresponds to the stacking direction of the stacked body 20S. The X-axis direction is along the medium-facing surface 30F of the first magnetic pole 31. The angle between the first direction D1 and the medium-facing surface 30F is taken as an angle θ1. The angle θ1 is, for example, not less than 15 degrees and not more than 30 degrees. The angle θ1 may be 0 degrees.

When the first direction D1 is oblique to the X-axis direction, the thicknesses of the layers correspond to lengths along the first direction D1. The configuration in which the first direction D1 is oblique to the X-axis direction is applicable to any magnetic head according to the first or second embodiment.

Figure 11:
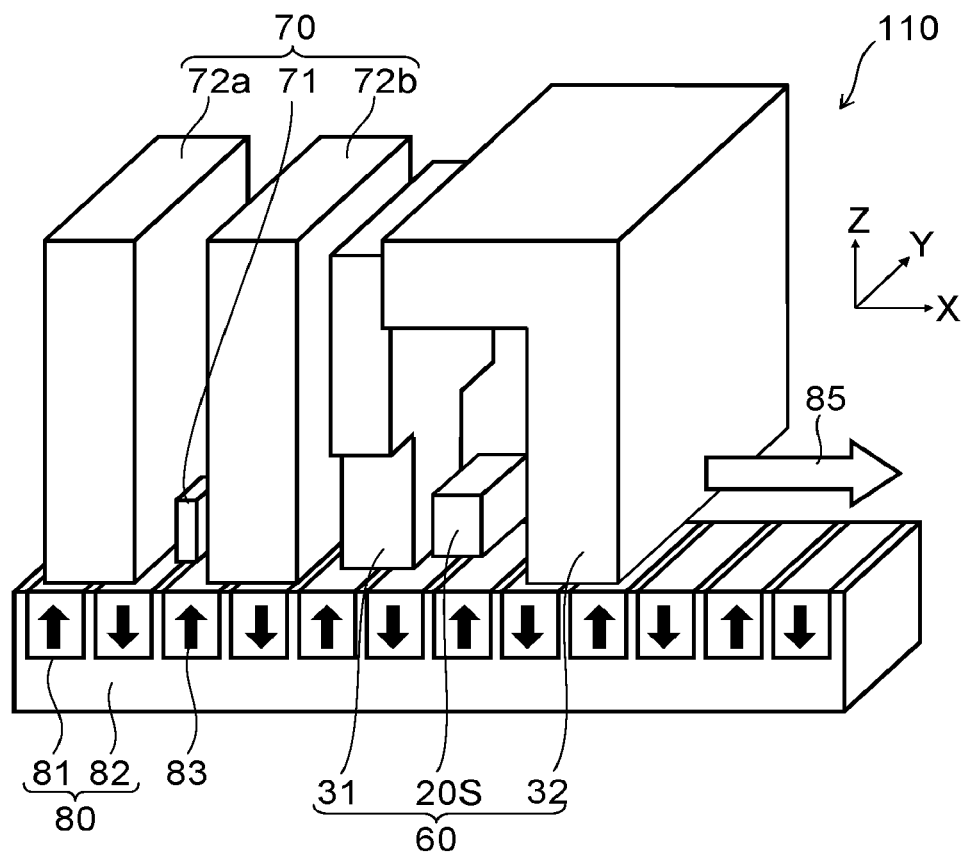
FIG. 11 is a schematic perspective view illustrating the magnetic recording device according to the embodiment.

FIG. 11 is a schematic perspective view illustrating the magnetic recording device according to the embodiment.

As shown in FIG. 11, the magnetic head (e.g., the magnetic head 110) according to the embodiment is used with the magnetic recording medium 80. In the example, the magnetic head 110 includes the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproduction magnetic shield 72a, a second reproduction magnetic shield 72b, and a magnetic reproducing element 71. The magnetic reproducing element 71 is located between the first reproduction magnetic shield 72a and the second reproduction magnetic shield 72b. The magnetic reproducing element 71 is configured to output a signal corresponding to the magnetization 83 of the magnetic recording layer 81.

As shown in FIG. 11, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

Figure 12:
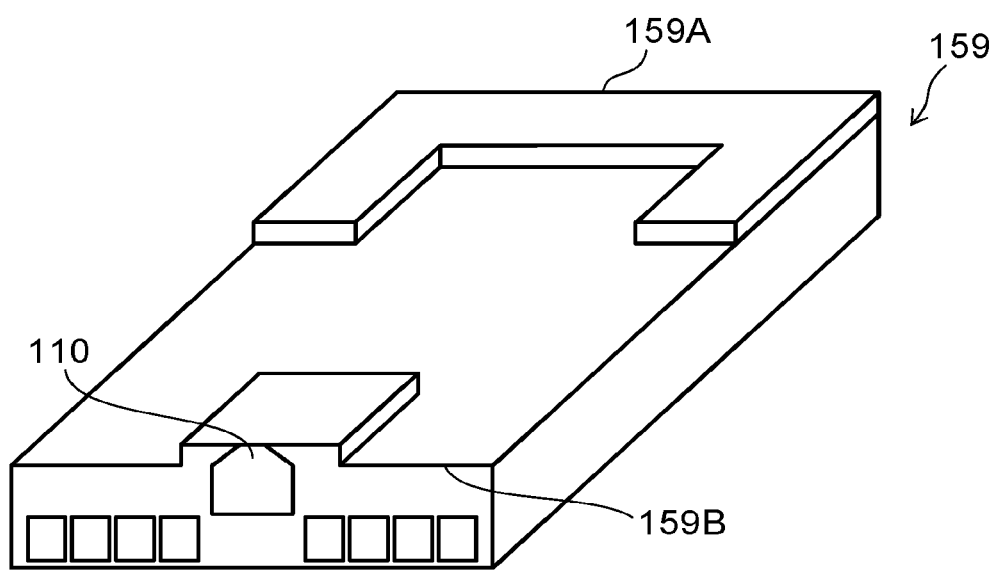
FIG. 12 is a schematic perspective view illustrating a portion of the magnetic recording device according to the embodiment.

FIG. 12 is a schematic perspective view illustrating a portion of the magnetic recording device according to the embodiment.

FIG. 12 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is located at the side surface of the air outflow side 159B of the head slider 159, etc. Thereby, the magnetic head 110 moves relative to the magnetic recording medium while flying over or contacting the magnetic recording medium.

Figure 13:
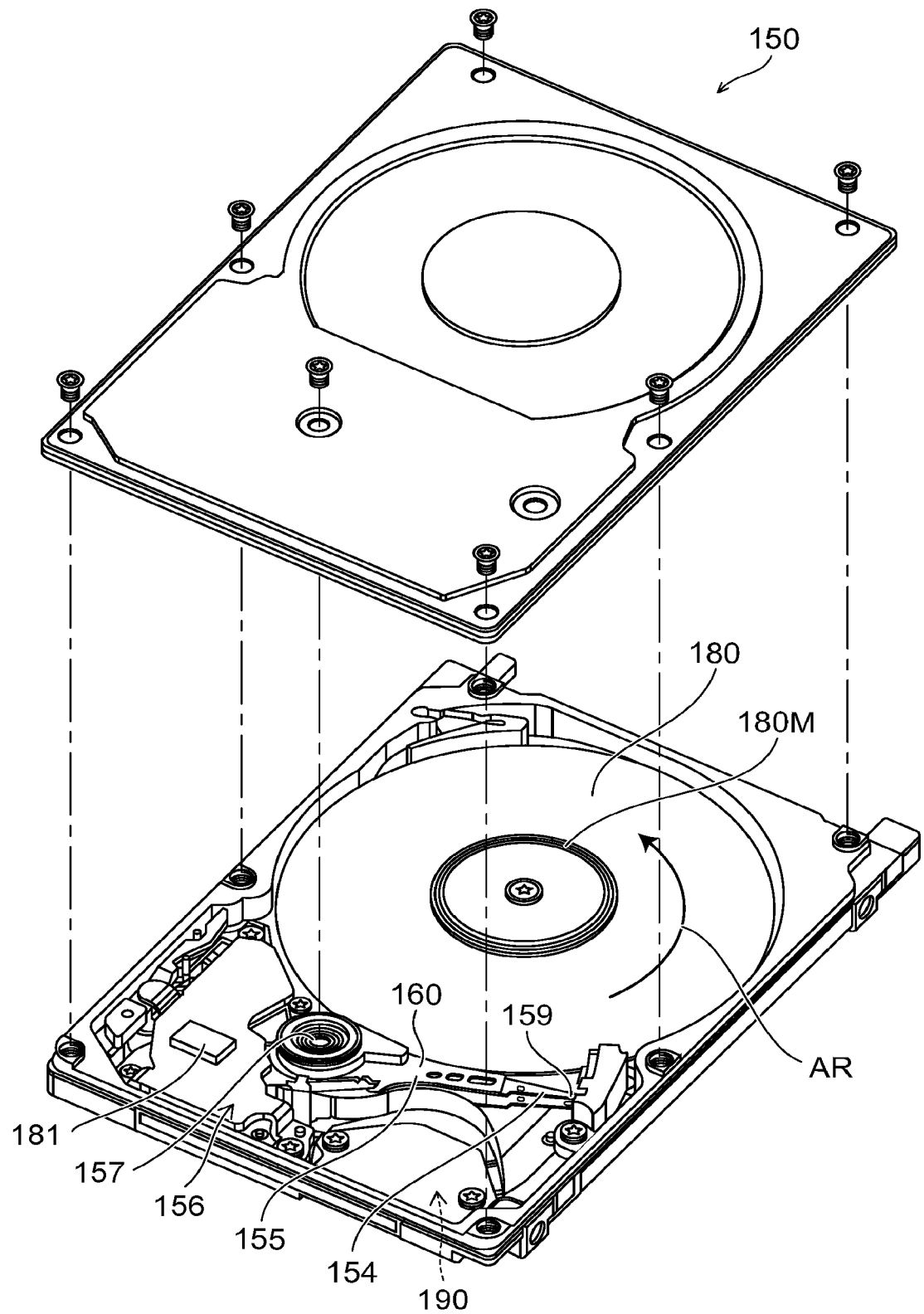
FIG. 13 is a schematic perspective view illustrating a magnetic recording device according to the embodiment.

FIG. 13 is a schematic perspective view illustrating a magnetic recording device according to the embodiment.

Figure 14A:
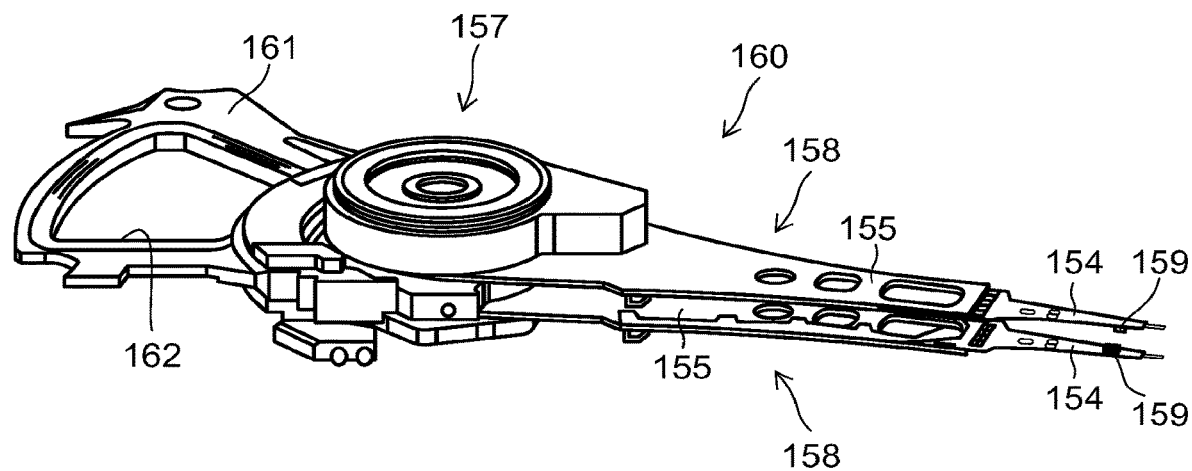
FIGS. 14A and 14B are schematic perspective views illustrating a portion of the magnetic recording device according to the embodiment.
Figure 14B:
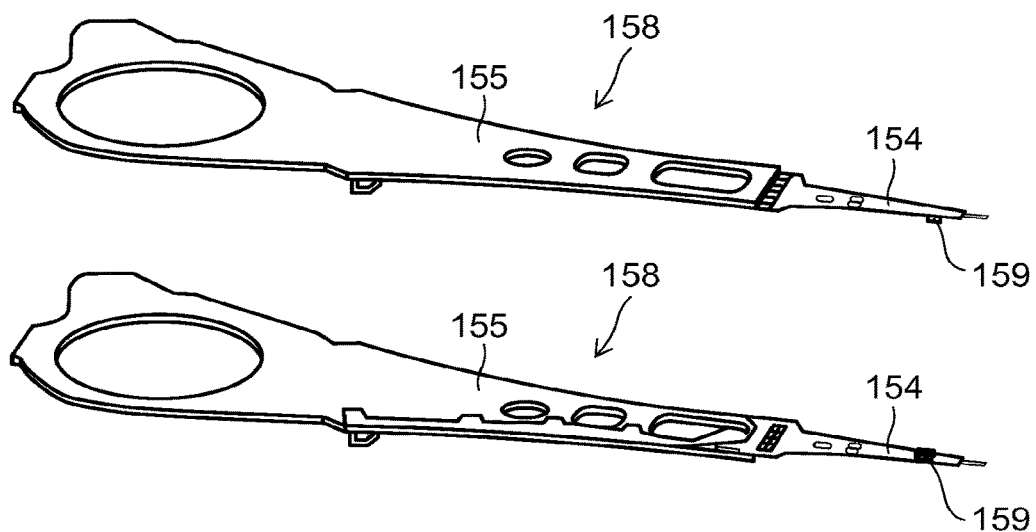

FIGS. 14A and 14B are schematic perspective views illustrating a portion of the magnetic recording device according to the embodiment.

As shown in FIG. 13, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. According to the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is located between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 14A illustrates the configuration of a portion of the magnetic recording device and is an enlarged perspective view of a head stack assembly 160.

FIG. 14B is a perspective view illustrating a magnetic head assembly (a head gimbal assembly (HGA)) 158 that is a portion of the head stack assembly 160.

As shown in FIG. 14A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 14B, the head gimbal assembly 158 includes the arm 155 extending from the bearing part 157, and the suspension 154 extending from the arm 155.

The head slider 159 is provided at the tip of the suspension 154. The magnetic head according to the embodiment is provided in the head slider 159.

The magnetic head assembly (the head gimbal assembly) 158 according to the embodiment includes the magnetic head according to the embodiment, the head slider 159 in which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

Embodiments may include the following configurations (e.g., technological proposals).

Configuration 1

A magnetic head, comprising:

a first magnetic pole;

a second magnetic pole; and a stacked body provided between the first magnetic pole and the second magnetic pole, the stacked body including a first magnetic layer, a second magnetic layer provided between the first magnetic pole and the first magnetic layer, a third magnetic layer provided between the first magnetic pole and the second magnetic layer, a first nonmagnetic layer provided between the second magnetic layer and the first magnetic layer, the first nonmagnetic layer including Cu, a second nonmagnetic layer provided between the third magnetic layer and the second magnetic layer, and a third nonmagnetic layer provided between the first magnetic pole and the third magnetic layer, the second magnetic layer including a first magnetic region and a second magnetic region, the second magnetic region being between the second nonmagnetic layer and the first magnetic region, the first magnetic region including a first element including at least one of Fe, Co, or Ni, the second magnetic region including the first element, and a second element including at least one selected from the group consisting of Cr, V, Mn, Ti, and Sc, the first magnetic region not including the second element, or a concentration of the second element in the first magnetic region being less than a concentration of the second element in the second magnetic region.

Configuration 2

The magnetic head according to Configuration 1, wherein
the concentration of the second element in the first magnetic region is not less than 0 atomic % but less than 20 atomic %, and
the concentration of the second element in the second magnetic region is not less than 20 atomic % and not more than 50%.

Configuration 3

The magnetic head according to Configuration 1 or 2, wherein
the first magnetic layer includes Fe and Co.

Configuration 4

The magnetic head according to any one of Configurations 1 to 3, wherein
the second nonmagnetic layer includes Cu.

Configuration 5

The magnetic head according to Configuration 4, wherein
the second nonmagnetic layer includes the second element.

Configuration 6

The magnetic head according to any one of Configurations 1 to 5, wherein
the third nonmagnetic layer includes Cu.

Configuration 7

The magnetic head according to any one of Configurations 1 to 6, wherein
the third magnetic layer includes the first and second elements.

Configuration 8

The magnetic head according to any one of Configurations 1 to 6, wherein
the stacked body further includes a fourth magnetic layer,
the fourth magnetic layer is between the first magnetic pole and the third nonmagnetic layer,
the third magnetic layer includes the first element, and
the third magnetic layer does not include the second element, or a concentration of the second element in the third magnetic layer is less than the concentration of the second element in the second magnetic region.

Configuration 9

The magnetic head according to any one of Configurations 1 to 6, wherein
the stacked body further includes a fourth magnetic layer,
the fourth magnetic layer is between the first magnetic pole and the third nonmagnetic layer,
the fourth magnetic layer includes the first and second elements, and
the third magnetic layer includes the first and second elements.

Configuration 10

The magnetic head according to any one of Configurations 1 to 9, wherein
the first magnetic region contacts the first nonmagnetic layer, and
the second magnetic region contacts the second nonmagnetic layer.

Configuration 11

The magnetic head according to any one of Configurations 1 to 10, wherein
a thickness of the first magnetic region is not less than 0.5 nm and not more than 10 nm.

Configuration 12

The magnetic head according to any one of Configurations 1 to 11, wherein
a thickness of the second magnetic region is not less than 1 nm and not more than 7 nm.

Configuration 13

The magnetic head according to any one of Configurations 1 to 12, wherein
a thickness of the first magnetic layer is not less than 1 nm and not more than 3 nm.

Configuration 14

The magnetic head according to any one of Configurations 1 to 13, wherein
a thickness of the third magnetic layer is not less than 1 nm and not more than 5 nm.

Configuration 15

The magnetic head according to any one of Configurations 1 to 14, wherein
a thickness of the first nonmagnetic layer is not less than 1 nm and not more than 5 nm.

Configuration 16

The magnetic head according to any one of Configurations 1 to 15, wherein
a thickness of the second nonmagnetic layer is not less than 1 nm and not more than 5 nm.

Configuration 17

The magnetic head according to any one of Configurations 1 to 16, wherein
a thickness of the third nonmagnetic layer is not less than 1 nm and not more than 5 nm.

Configuration 18

The magnetic head according to any one of Configurations 1 to 17, wherein
a current flows through the stacked body and has an orientation from the first magnetic layer toward the third magnetic layer.

Configuration 19

A magnetic recording device, comprising:
the magnetic head according to any one of Configurations 1 to 17; and
an electrical circuit configured to supply a current to the stacked body,
the current having an orientation from the first magnetic layer toward the third magnetic layer.

Configuration 20

The magnetic recording device according to Configuration 19, further comprising:
a magnetic recording medium,
an electrical resistance of the stacked body being a first resistance when the current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current,
the electrical circuit being configured to supply the second current to the stacked body in a recording operation of recording information to the magnetic recording medium by using the magnetic head.

According to embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording devices such as magnetic heads, first magnetic poles, second magnetic poles, stacked bodies, magnetic layers, nonmagnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic pole and the first magnetic layer,
a third magnetic layer provided between the first magnetic pole and the second magnetic layer,
a first nonmagnetic layer provided between the second magnetic layer and the first magnetic layer, the first nonmagnetic layer including Cu,
a second nonmagnetic layer provided between the third magnetic layer and the second magnetic layer, and
a third nonmagnetic layer provided between the first magnetic pole and the third magnetic layer,
the second magnetic layer including a first magnetic region and a second magnetic region,
the second magnetic region being between the second nonmagnetic layer and the first magnetic region,
the first magnetic region including a first element including at least one of Fe, Co, or Ni,
the second magnetic region including
the first element, and
a second element including at least one selected from the group consisting of Cr, V, Mn, Ti, and Sc,
the first magnetic region not including the second element, or a concentration of the second element in the first magnetic region being less than a concentration of the second element in the second magnetic region,
wherein
the concentration of the second element in the first magnetic region is not less than 0 atomic % but less than 20 atomic %, and
the concentration of the second element in the second magnetic region is not less than 20 atomic % and not more than 50%.

2. The head according to claim 1, wherein
the first magnetic layer includes Fe and Co.

3. The head according to claim 1, wherein
the second nonmagnetic layer includes Cu.

4. The head according to claim 3, wherein
the second nonmagnetic layer includes the second element.

5. A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic pole and the first magnetic layer,
a third magnetic layer provided between the first magnetic pole and the second magnetic layer,
a first nonmagnetic layer provided between the second magnetic layer and the first magnetic layer, the first nonmagnetic layer including Cu,
a second nonmagnetic layer provided between the third magnetic layer and the second magnetic layer, and
a third nonmagnetic layer provided between the first magnetic pole and the third magnetic layer,
the second magnetic layer including a first magnetic region and a second magnetic region,
the second magnetic region being between the second nonmagnetic layer and the first magnetic region,
the first magnetic region including a first element including at least one of Fe, Co, or Ni,
the second magnetic region including
the first element, and
a second element including at least one selected from the group consisting of Cr, V, Mn, Ti, and Sc,
the first magnetic region not including the second element, or a concentration of the second element in the first magnetic region being less than a concentration of the second element in the second magnetic region,
wherein
the third nonmagnetic layer includes Cu.

6. A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic: pole and the first magnetic layer,
a third magnetic layer provided between the first magnetic pole and the second magnetic layer, a first nonmagnetic layer provided between the second magnetic layer and the first magnetic layer, the first nonmagnetic layer including Cu,
a second nonmagnetic layer provided between the third magnetic layer and the second magnetic layer, and
a third nonmagnetic layer provided between the first magnetic pole and the third magnetic layer,
the second magnetic layer including a first magnetic region and a second magnetic region,
the second magnetic region being between the second nonmagnetic layer and the first magnetic region,
the first magnetic region including a first element including at least one of Fe, Co, or Ni,
the second magnetic region including
the first element, and
a second element including at least one selected from the group consisting of Cr, V, Mn, Ti, and Sc,
the first magnetic region not including the second element, or a concentration of the second element in the first magnetic region being less than a concentration of the second element in the second magnetic region,
wherein
the third magnetic layer includes the first and second elements.

7. The head according to claim 1, wherein
the stacked body further includes a fourth magnetic layer,
the fourth magnetic layer is between the first magnetic pole and the third nonmagnetic layer,
the third magnetic layer includes the first element, and
the third magnetic layer does not include the second element, or a concentration of the second element in the third magnetic layer is less than the concentration of the second element in the second magnetic region.

8. The head according to claim 1, wherein
the stacked body further includes a fourth magnetic layer,
the fourth magnetic layer is between the first magnetic pole and the third nonmagnetic layer,
the fourth magnetic layer includes the first and second elements, and
the third magnetic layer includes the first and second elements.

9. The head according to claim 1, wherein
the first magnetic region contacts the first nonmagnetic layer, and
the second magnetic region contacts the second nonmagnetic layer.

10. The head according to claim 1, wherein
a thickness of the first magnetic region is not less than 0.5 nm and not more than 10 nm.

11. The head according to claim 1, wherein
a thickness of the second magnetic region is not less than 1 nm and not more than 7 nm.

12. The head according to claim 1, wherein
a thickness of the first magnetic layer is not less than 1 nm and not more than 3 nm.

13. The head according to claim 1, wherein
a thickness of the third magnetic layer is not less than 1 nm and not more than 5 nm.

14. The head according to claim 1, wherein
a thickness of the first nonmagnetic layer is not less than 1 nm and not more than 5 nm.

15. The head according to claim 1, wherein
a thickness of the second nonmagnetic layer is not less than 1 nm and not more than 5 nm.

16. The head according to claim 1, wherein
a thickness of the third nonmagnetic layer is not less than 1 nm and not more than 5 nm.

17. The head according to claim 1, wherein
a current flows through the stacked body and has an orientation from the first magnetic layer toward the third magnetic layer.

18. A magnetic recording device, comprising:
the magnetic head according to claim 1; and
an electrical circuit configured to supply a current to the stacked body,
the current having an orientation from the first magnetic layer toward the third magnetic layer.

19. The device according to claim 18, further comprising:
a magnetic recording medium,
an electrical resistance of the stacked body being a first resistance when the current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current,
the electrical circuit being configured to supply the second current to the stacked body in a recording operation of recording information to the magnetic recording medium by using the magnetic head.

* * * * *